3,651,070
POLYCHLORO HYDROXY DERIVATIVES OF MONOCARBOXY PYRIDINES

Charles E. Granito, Cherry Hill, N.J., assignor to Diamond Shamrock Corporation, Cleveland, Ohio
No Drawing. Filed July 9, 1969, Ser. No. 840,535
Int. Cl. C07d 31/36
U.S. Cl. 260—295 R                     2 Claims

ABSTRACT OF THE DISCLOSURE

Novel polychloro hydroxy derivatives of monocarboxy and dicarboxy pyridines, their methods of preparation and utilization as pesticides are disclosed.

FIELD OF THE INVENTION

This invention relates to new compositions of matter and methods for their preparation, and more particularly, to a class of novel chemical compounds useful as pesticides including herbicides, bactericides and fungicides.

SUMMARY OF THE INVENTION

This invention presents novel compositions of substituted pyridines of the general formula

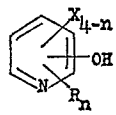

where X is halogen, $n$ is an integer of 1 or 2 and R is like or unlike radicals of the carboxylate group including acids, salts and esters thereof, with the provisions that R is not in the 3-position when the hydroxyl radical is in the 4-position and $n$ is one, and R is not in the 2-position when the hydroxyl radical is in the 6-positions and $n$ is one.

It is a principal object of this invention to provide novel chemical compositions having pesticidal properties enabling their application alone or in formulations to achieve such pesticidal utilization.

DESCRIPTION OF THE PREFERRED EMBODIMENTS

Compounds exemplary of the foregoing general structure include:

Trichloro-4-hydroxypicolinic acid

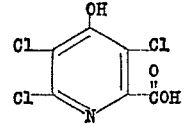

Dichloro-4-hydroxydipicolinic acid dihydrate

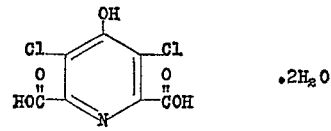

Trichloro-2-hydroxyisonicotinic acid

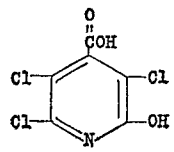

Dimethyl dichloro-4-hydroxydipicolinate hydrate

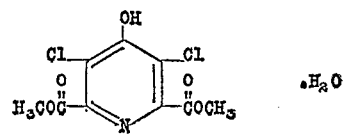

Potassium trichloro-2-hydroxyisonicotinate

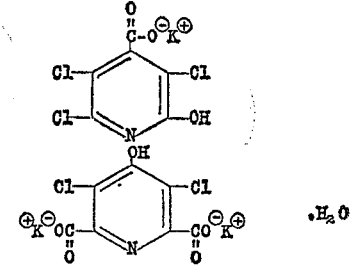

Monopotassium dichloro-4-hydroxydipicolinate hydrate

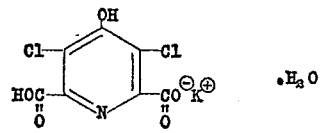

Potassium trichloro-4-hydroxypicolinate

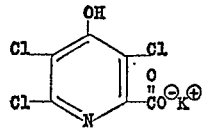

While it is possible to apply the compounds in undiluted form to the locus to be protected or the pest to be eradicated, it is more desirable to apply them in admixture with either solid or liquid inert adjuvants. Thus, they can be applied to the plants for fungicidal purposes, for example, by spraying the plants with aqueous or organic solvent dispersions of the compound. Similarly, wood surfaces can be protected by applying a protective film of the compound by brushing, spraying or dipping, utilizing a liquid dispersion of the compound. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, and petroleum naphtha; ketones such as acetone, methyl ethyl ketone and cyclohexanone; chlorinated hydrocarbons such as carbon tetrachloride, chloroform, trichloroethylene and perchloroethylene; esters such as ethyl acetate, amyl acetate and butyl acetate; the monoalkyl ethers of ethylene and diethylene glycol, e.g., the monomethyl or monoethyl esters; alcohols such as ethanol, isopropanol and amyl alcohol; and the like.

The pesticidal compounds can also be applied to plants and other materials along with inert solid adjuvants or carriers such as talc, pyrrophyllite, attapulgite, kieselguhr, chalk, diatomaceous earth, lime, calcium carbonate, bentonite, kaolinite, cottonseed hulls, wheat flour, soybean flour, pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters, addition products of long chain mercaptans and ethylene oxide, sodium alkyl benzene sulfonates having 14 to 18 carbon atoms, alkylphenolethylene oxides, e.g., p-isooctylphenol condensed with 10 ethylene oxide units; and soaps, e.g., sodium stearate and sodium oleate.

The solid and liquid formulations can be prepared by any suitable method. Thus, the active ingredients, in finely divided form if a solid, may be tumbled together with finely divided solid carrier. Alternatively, the active ingredient in liquid form, including solutions, dispersions, emulsions, and suspensions thereof, may be admixed with the finely divided solid carrier in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50% of the total by weight. However, concentrations outside this range are operative and compositions containing from .1 to 99% of active ingredient by weight are contemplated, the remainder being carrier and/or any other additive or adjuvant which may be desired. It is often advantageous to add small percentages of surface active agents, e.g., 0.1 to 1% of the total composition by weight, to dust formulations.

For spray applications, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0% by weight of a surface active agent is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and maybe 10%, or even as low as 0.01%.

The pesticidal compounds of the present invention can be employed in compositions containing other pesticides, more especially fungicides, insecticides, and bactericides, e.g., phenothiazine, pyrethrum, rotenone, DDT, etc.

Preparation of the compounds

In general the compounds of this invention can be prepared by reacting the suitable precursor, which is a compound selected from the group of chlorinated cyanopyridines or chlorinated dicyanopyridines, with water in the presence of a base or an acid, or both in sequence, depending upon whether the final product is to be a salt or an acid. The bases employed are generally strong alkali bases. Water-miscible solvents such as sulfolane or methanol may be used to facilitate reaction. Where the end product has impurities, recrystallization techniques can be used for purification.

In order that those skilled in the art may more completely understand the present invention and the preferred methods by which the same may be carried into effect, the following examples are offered. In the following examples, the various chloropyridinecarboxylic acid intermediates may be prepared by acidic or alkaline hydrolysis of the corresponding nitriles.

EXAMPLE 1

Preparation of trichloro-4-hydroxypicolinic acid

A solution of 0.05 mole of tetrachloropicolinic acid and 0.05 mole of sodium hydroxide in 100 ml. of water and 75 ml. of sulfolane was heated at 90–105° C. for 1½ hours in a reaction vessel. The resulting reaction mixture was poured into water, acidified with concentrated hydrochloric acid and filtered. The product was dissolved in a dilute sodium hydroxide solution, precipitated with concentrated hydrochloric acid and washed with water giving a 29.8% yield of pure trichloro-4-hydroxypicolinic acid, which decomposes upon heating at 191–192° C. Elemental analysis showed 43.5% chlorine compared with a calculated value of 43.6%.

EXAMPLE 2

Preparation of dichloro-4-hydroxydipicolinic acid dihydrate

A solution of 0.05 mole of 3,4,5-trichlorodipicolinic acid and 0.05 mole of sodium hydroxide in 100 ml. of water and 75 ml. of sulfolane was heated at 90–105° C. for 1½ hours in a reaction vessel. The resulting reaction mixture was poured into water, acidified with concentrated hydrochloric acid and filtered. The product was dissolved in a dilute sodium hydroxide solution, precipitated with concentrated hydrochloric acid and washed with water giving a 71.5% yield of pure dichloro-4-hydroxydipicolinic acid dihydrate melting at 293.5 to 295.5° C. Elemental analysis showed 28.6% carbon, 2.4% hydrogen, 23.9% chlorine, and 4.8% nitrogen. Calculation gives 29.1% carbon, 2.4% hydrogen, 24.6% chlorine, and 4.9% nitrogen.

EXAMPLE 3

Preparation of trichloro-2-hydroxyisonicotinic acid

The same procedure used in Example 1 was practiced here, substituting tetrachloroisonicotinic acid for the tetrachloropicolinic acid, giving a 64.2% yield of pure trichloro-2-hydroxyisonicotinic acid, melting at 284–285.5° C. Elemental analysis showed the product contained 43.7% chlorine which is close to the theoretical 43.9% chlorine calculated for this compound.

EXAMPLE 4

Preparation of dimethyl dichloro-4-hydroxydipicolinate hydrate

A solution of 0.1 mole of trichlorodipicolinic acid in 300 ml. of methanol was saturated with hydrogen chloride by bubbling HCl into the refluxing solution for five hours. The solution was cooled and the product filtered. The product was purified by recrystallization from methanol giving a 60.6% yield of pure dimethyl dichloro-4-hydroxydipicolinate hydrate melting at 125–127° C. On elemental analysis, 35.6% carbon, 2.7% hydrogen, 23.9% chlorine and 4.8% nitrogen were found corresponding to a calculated 36.3% carbon, 3.0% hydrogen, 23.8% chlorine and 4.7% nitrogen.

EXAMPLES 5–7

Additional compounds were prepared by reacting a different precursor listed for each new compound in the following table and one or two equivalent weights of potassium hydroxide and around 30 ml. of water, all being charged into a 125 ml. flask. The mixture was heated to dissolve the solids and then the insoluble were filtered off. The water was evaporated from the filtrate and the residue was oven dried under vacuum. Table 1 is a summary of these preparations with the first column being the example number, the second column listing the precursors, the third column listing the product, the fourth column listing the melting point of the product, and the fifth column listing the analysis of the product.

on the slowest growing broadleaf (zinnia). This requires between 7 and 14 days depending upon the time of the year. When the plants (seedlings) have reached this stage of development, and one day prior to spraying, the remaining portion of the soil plot is seeded as before, but broadleaves and grasses are reversed.

The pans are then sprayed at 10 p.s.i., uniformly covering the surface of the soil and the foliage with 40 ml. of test formulation (2080 p.p.m.) at a dosage of 16 pounds per acre. This formulation contains 0.083 g. chemical (0.08 ml. if a liquid), 20.0 ml. acetone, 2.0 ml. stock emulsifier solution (0.5% Triton X–155 in water by volume), and 18.0 ml. distilled water.

Two weeks after treatment, percent control is estimated and information on phytotoxicity, growth regulation, and other effects are recorded. Using this procedure, the following results are obtained:

| Compound | Dosage (lbs./a.) | Percent control and other effects | | | |
|---|---|---|---|---|---|
| | | Post-emergence | | Pre-emergence | |
| | | Broad-leaves | Grasses | Broad-leaves | Grasses |
| Dimethyl dichloro-4-hydroxydipicolinate hydrate | 16 | | | [1] 35 | [1] 0 |

[1] No buckwheat.

EXAMPLE 9

Soil drench and post-emergence foliage spray combination

To measure the foliage contact and soil drench herbicidal activity of compounds of this invention, a test formulation of 150 ml. is prepared for both the soil drench and foliage spray treatments. This formulation contains 0.36 g. of the test chemical (or 0.36 ml. of a liquid), 6.0 ml. acetone, 3.0 ml. stock emulsifier solution (0.5% Triton X–155 in water by volume), and 141.0 ml. distilled water.

The plants used for this test are planted in 3½-inch pots as follows:

(a) Tomato, var. Bonny Best, one plant per pot;
(b) Garden bean, var. Tendergreen, four plants per pot;
(c) Field corn, var. Cornell M–3, four plants per pot;
(d) Oats, var. Russell, 15 to 20 plants per pot.

TABLE 1

| Example | Reactants | Product | Melting point, ° C. | Percent chlorine | |
|---|---|---|---|---|---|
| | | | | Found | Calculated |
| 5 | Trichloro-2-hydroxyisonicotinic acid and one equivalent weight of KOH. | Potassium trichloro-2-hydroxyisonicotinate. | 347–350 | 37.6 | 37.9 |
| 6 | Dichloro-4-hydroxydipicolinic acid and two equivalent weights of KOH. | Dipotassium dichloro-4-hydroxydipicolinate hydrate. | >360 | 20.7 | 20.5 |
| 7 | Dichloro-4-hydroxydipicolinic acid and one equivalent weight of KOH. | Monopotassium dichloro-4-hydroxydipicolinate hydrate. | >360 | 22.5 | 23.0 |

EXAMPLE 8

Pre- and post-emergence tests in soil, broadleaf and grass species

This test measures the pre- and post-emergence herbicidal activity of test chemicals applied to the foliage of seedling plants, as well as to the soil in which they are growing. Seeds of six species are planted in soil contained in 9 x 9 x 2-inch aluminum cake pans filled to within ½-inch of the top with composted greenhouse soil. The seeds planted consist of three broadleaf species (buckwheat, *Fagopyrum esculentum,* turnip, *Brassica rapa,* and zinnia, *Zinnia* spp.) and three grass species (sorghum, *Sorghum vulgare,* Italian millet, *Panicum ramosum,* and perennial ryegrass, *Lolium prenne*). The soil in each pan is divided into two equal rectangular areas, and the broadleaves are seeded into one-half of one of these areas and the grasses into the other half of the same area. The seeds are then covered uniformly with about one-fourth inch of soil and watered, after which they are removed to the greenhouse and the test species are allowed to grow until one true leaf is present The various test species are planted so that at treatment time they are at the following stages of growth:

(a) Tomato—three to five inches tall;
(b) Bean—the first trifoliate leaf begins to unfold;
(c) Corn—four to six inches tall;
(d) Oats—three to five inches tall.

In the soil drench treatment the soil surface of each pot (tomato, bean, corn, and oats) is drenched with 17.5 ml. of the test compound, resulting in an application of 64 pounds per acre. The four pots are then sprayed simultaneously with the remaining 80 ml. of formulation on a rotating turntable in a hood at 40 p.s.i. This foliage spray contains 2400 p.p.m. of chemical or about two pounds of active chemical per 100 gallons of water solution. After the plant foliage dries, the plants are placed in the greenhouse. The results are recorded fourteen days after treatment. Phytotoxicity is rated on the scale from 0, indicating no plant injury, to 11, plant kill and, additionally, stunting of the plant is rated on a scale of 1—slight to 9—severe. Chemicals found to give a phytotoxicity rating of 10 or more or a stunting rating of 9 on one or more of the test species are retested at lower rates. On retesting, the soil drench and foliage spray treatments are carried out as separate tests. Only those species on which suitable ratings were obtained for phytotoxicity or stunting or both are retained for testing at lower dosages and remaining species are dropped from further testing. Other responses such as formative effects (Fe), defoliant activity, growth-regulant properties, and chlorosis are recorded. Using this procedure, the following results are obtained:

contains 2400 p.p.m. of chemical or about two pounds of active chemical per 100 gallons of water solution with dilution for lower concentrations tested. After the plant foliage dries, the plants are placed in the greenhouse. The results are recorded 14 days after treatment. Ratings are based on a scale of 100 percent for total control of the blight. Chemicals found to give a very high rating in the initial test are retested at lower rates. On retesting the soil drench and foliage spray treatments are carried out as

| Compound | Lbs./a. | P.p.m. | Phytotoxicity and other effects | | | | | | | |
|---|---|---|---|---|---|---|---|---|---|---|
| | | | Soil watering | | | | Foliage spray | | | |
| | | | To | Be | Co | Oa | To | Be | Co | Oa |
| Trichloro-4-hydroxypicolinic acid | 64 | 2,400 | 11 | 10 | 8 | 10 | 11 | 10 | 8 | 10 |
| Potassium trichloro-4-hydroxypicolinate | Stunts bean plants at 2,400 p.p.m. for spray and 74 lbs./acre for soil watering | | | | | | | | | |

EXAMPLE 10

Rusticide Test

This test determines the effective capacity of the test compounds as systemic corn rusticides. The heat-rust system employed is *Uromyces phaseoli* on *Phaseolus vulgarius* var. *pinto* which are tested in four-inch clay pots. A dosage of 45 ml. of the test formulation, equivalent to 45 mg. of chemical or 64 pounds per acre, is drenched on each pot. This test formulation contains 0.1 g. (or 0.1 ml. if a liquid) of the test chemical, 4.0 ml. acetone, 2.0 ml. stock emulsifier solution (0.5% Triton X–155 in water by volume), and 94.0 ml. distilled water. The concentration of toxicant in this formulation is 1000 parts per million. Lower concentrations of toxicant are obtained by diluting the formulation with distilled water.

Twenty-four hours after application of the test chemical, the plants are inoculated by atomizing onto the plant leaves a single aqueous suspension containing the uredospore species. Subsequently the plants are kept for an overnight incubation period at 60° F. and 100 percent relative humidity. Pustule counts are made seven to ten days after inoculation and effective control is reported as percent disease control based upon pustule development in non-treated control plants. Additionally, phytotoxicity of the plants by the test chemical is rated by visual observation on a scale from 0, indicating no plant injury, to 11, indicating plant kill. Using this procedure, the following results are obtained:

| Compound tested | Dosage, lbs./acre | Percent disease control, corn |
|---|---|---|
| Potassium trichloro-2-hydroxyisonicotinate | 64 | 50 |

EXAMPLE 11

Bean halo blight

Test formulations are examined for ability to control bean halo blight (*Pseudomonas Phaseolicola*). A test formulation of 150 ml. is prepared for both the soil drench and foliage spray treatments. This formulation contains 0.36 grams of the test chemical, 6.0 ml. acetone, 3.0 ml. stock emulsifier solution (0.5% Triton X–155 in water by volume), and 141 ml. distilled water.

The plants used for this test, garden bean var. Tendergreen, four plants per pot, are planted in 3½ inch pots. At treatment time the beans have reached a stage of growth such that the first trifoliate leaf begins to unfold. Two of the bean plants per pot are inoculated by injection with the bean halo blight using a hypodermic syringe. The organism is taken off a slant culture medium.

In the soil drench treatment the soil surface of each pot is drenched with 17.5 ml. of the test compound, resulting in an application of 64 pounds per acre. The test pots inoculated with the bean halo blight are then sprayed simultaneously with the remain 80 ml. of formulation on a rotating turntable in a hood at 40 p.s.i. This foliage spray separate tests. Using this procedure, the following results are obtained:

| Compound | Dosage | | Percent control | |
|---|---|---|---|---|
| | Lbs./a. | P.p.m. | Soil drench | Foliage spray |
| Dimethyl dichloro-4-hydroxydipicolinate hydrate | 64 | 2,400 | 100 | 100 |
| | | 1,200 | | 100 |
| | | 600 | | 100 |

EXAMPLE 12

Fungicides—foliage protectant and eradicant tests

The tomato foliage disease test measures the ability of the test compound to protect tomato foliage against infection by the early blight fungus *Alternaria solani* (Ell. and Mart.) Jones and Grout and the late blight fungus *Phytophthora infestans* (Mont.) deBary. The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 2000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse.

After two days from the start of the test for early blight and three days for late blight, lesion counts are made on the three uppermost fully expanded leaves. The data are converted to percent disease control based on the number of lesions obtained on the control plants. Dosages and percent disease control are given in the following table:

| Compound | Dosage, p.p.m. | Percent disease control | |
|---|---|---|---|
| | | E. blight | L. blight |
| Dichloro-4-hydroxydipicolinic acid dihydrate | 1,000 | 100 | 100 |

EXAMPLE 13

Systemic bactericidal test

Test formualtions are examined for ability to control tomato crown gall (*Agrobacterium tumefaciens*). A test formulation containing 0.24 g. of the test chemical (or 0.24 ml. if a liquid), 4.0 ml. acetone, 2.0 ml. stock emulsifier solution (0.5% Triton X–155 in water by volume), and 94.0 ml. distilled water is prepared for both the soil drench and foliage spray treatments. Individual tomato plants, var. Rutgers, are planted in 3½ inch clay pots and are 3 to 5 inches tall at treatment time. Stem puncture inoculation, at the cotylodonary node, with a cellular suspension of the *Agrobacterium tumefaciens* is made one to two hours prior to the soil drench and foliage spray treatment.

In the soil drench treatment, the test formulation is applied at the soil surface of each pot; 17.5 ml. of the formulation being equivalent to a dosage of the test chemical of 64 pounds per acre with dilution for lower concentrations tested. Control is determined through visual observation of tumor formation 10 to 14 days after treatment.

A rating of 90% is given to an estimate of complete control. Using this procedure, the following results are obtained:

| Compound | Dosage, lbs./a. | Percent control |
|---|---|---|
| Trichloro-4-hydroxypicolinic acid | 32 | 100 |

It is to be understood that although the invention has been described with specific reference to particular embodiments thereof, it is not to be so limited since changes and alterations therein may be made which are within the full intended scope of this invention as defined in the appended claims.

What is claimed is:
1. As a composition of matter, a compound selected from the group consisting of trichloro-2-hydroxyisonicotinic acid, the lower alkyl esters thereof and the alkali metal salts thereof.
2. Trichloro-2-hydroxyisonicotinic acid.

References Cited

UNITED STATES PATENTS 3,251,849  5/1966  Tomita _____ 260—295

ALAN L. ROTMAN, Primary Examiner

U.S. Cl. X.R.

260—295.5 R; 424—266

UNITED STATES PATENT OFFICE
CERTIFICATE OF CORRECTION

Patent No. 3,651,070     Dated March 21, 1972

Inventor(s) Charles E. Granito

It is certified that error appears in the above-identified patent and that said Letters Patent are hereby corrected as shown below:

Column 2, between the structural formulae on lines 35-45, read --Dipotassium dichloro-4-hydroxypicolinate hydrate--.

Column 5, line 68, for "prenne", read --_perenne_--.

Column 8, line 17, for "74 lbs./acre", read --64 lbs./acre--.

Column 8, line 26, the value "64" should be on line 25 and the bracket removed.

Signed and sealed this 12th day of September 1972.

(SEAL)
Attest:

EDWARD M.FLETCHER,JR.
Attesting Officer

ROBERT GOTTSCHALK
Commissioner of Patents